(No Model.)
J. D. SHEARMAN.
BUCKET WASHING MACHINE.
No. 285,312. Patented Sept. 18, 1883.
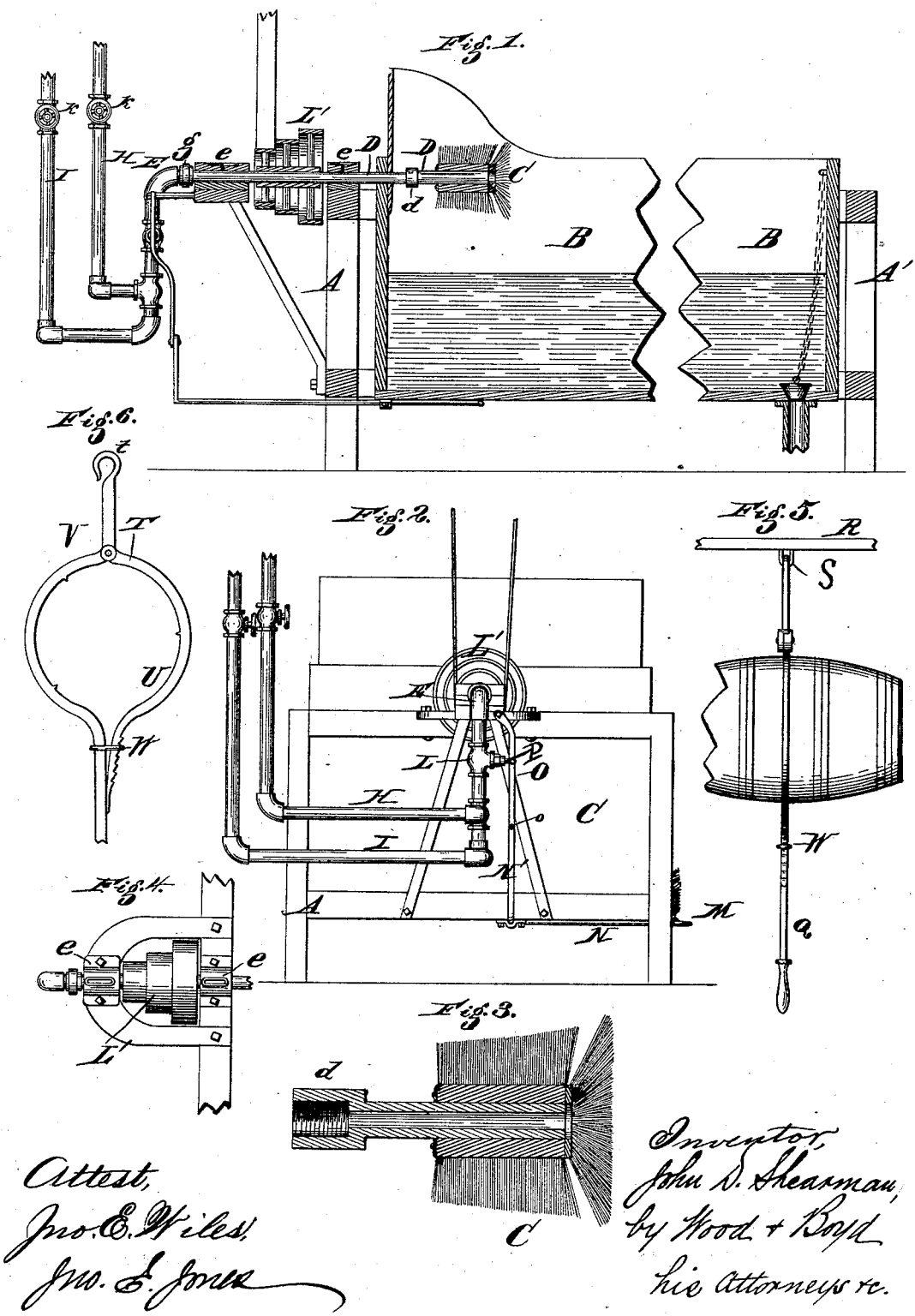
Attest,
Jno. E. Wiles
Jno. E. Jones
Inventor,
John D. Shearman,
by Wood + Boyd
his Attorneys &c.

UNITED STATES PATENT OFFICE.

JOHN D. SHEARMAN, OF AVONDALE, OHIO.

BUCKET-WASHING MACHINE.

SPECIFICATION forming part of Letters Patent No. 285,312, dated September 18, 1883.

Application filed April 14, 1883. (No model.)

*To all whom it may concern:*

Be it known that I, JOHN D. SHEARMAN, a citizen of the United States, and a resident of Avondale, in the county of Hamilton and State of Ohio, have invented certain new and useful Improvements in Bucket, Tub, and Barrel Washing Machines, of which the following is a specification.

My invention relates to an improvement in bucket, tub, and barrel washing machines.

One object of my invention is to combine with a brush revolving on a hollow shaft, which supplies water to the brush, a cold-water and live-steam pipe, suitable valves for regulating the temperature of the water, and a cut-off valve operated, by a foot-lever under control of the operator, to cut off all of the water when it is desired to stop washing or to change a vessel.

Another object of my invention is to provide means for suspending large vessels—such as barrels—and holding them on the brush for washing, all of which will be fully set forth in the description of the accompanying drawings, in which—

Figure 1 is an elevation of my improvement attached to a washing-tank, which is in longitudinal section. Fig. 2 is an end elevation of the same. Fig. 3 is an enlarged view of my detachable brush. Fig. 4 is a plan view of the driving-pulley and bracket. Fig. 5 is an elevation of the barrel-support. Fig. 6 is a plan view of the same.

A A' represent the frame supporting the washing-tank B.

C represents a brush, rigidly attached to a revolving hollow shaft, D, which is made with a section-coupling, $d$, so as to allow brushes of different sizes to be readily applied.

$e$ $e$ represent bearings for shaft D.

E represents one main water-supply pipe, to which shaft D is connected by a union-coupling joint, $g$.

H represents a cold-water pipe tapping pipe E.

I represents a live-steam or hot-water supply-pipe, also tapping main pipe E.

K K represent valves for regulating the amount of steam or hot water respectively admitted to the main supply-pipe. By the means here shown of connecting pipes H, I, and E and valves K, either hot, cold, or temperate water may be admitted onto the brush C for washing the vessels.

L represents a straight-way valve in pipe E upon the junction of pipes H I.

M N N' represent a foot bell-crank lever journaled to the bottom of tank B and jointed to link-rod O by pivot $o$.

P represents the valve-stem, pivoted to link O.

When foot-lever M is pressed down straight-way valve L is opened and water suitably heated by the live steam is admitted to brush C. This arrangement of foot-lever is very important. The operator stands while washing a vessel with one foot holding down foot-lever M, and water is freely admitted to brush C. Whenever a vessel is to be taken off the operator removes his foot from lever M and the water supply is instantly cut off, saving a waste of water and preventing the operator from becoming splashed.

R represents one side of the frame of the tank.

S is a staple driven into the frame-board R; T, a pair of clamp-tongs, detachably secured in place by a hook, $t$, at one end thereof, engaging staple S.

Q is a handle; W, a link catch or loop for holding prongs U V of clamp T against the handle-prong. The clamp-tongs T are secured around the cask, tub, or barrel as shown in Fig. 5. The operator can seize handle Q and swing the cask easily over the brush C, and then holds it till it is washed, when it is swung off and a second one placed in the tongs.

L' represents cone-pulleys for driving shaft D and brush C.

Instead of connecting the hollow shaft D with the main supply-pipe E by a union coupling, $g$, it is obvious that it could be made to revolve in the bearings $e$ upon a stationary inner water-supply pipe tapping at one of its ends the end of the pipe E, and having a thimble or collar at the opposite end to hold the said hollow shaft or sleeve in place upon it. Any leakage at the point of union of the water-supply pipe E and the hollow shaft D would thus be entirely obviated.

I claim—

1. In a barrel-washing machine, the combination, with a hollow shaft, D, carrying at one end a rigidly-attached brush, C, and arranged to rotate in bearings on a supporting-frame, of a supply-pipe, E, connected at one end with the hollow shaft by a coupling, g, and cold-water and steam pipes H and I, both connecting with the other end of the supply-pipe and each provided with a stop-valve, K.

2. In a bucket-washing machine, the combination of pipes H, I, and E, straight-way valve L, pivoted to link O, and foot-lever M N N', substantially as herein set forth.

3. In combination with the washing-machine A B, having revolving brush C and supply-pipe E, the swinging clamp T, substantially as herein set forth.

In testimony whereof I have hereunto set my hand.

JOHN D. SHEARMAN.

Witnesses:
   JNO. E. JONES,
   A. GLUCHOWSKY.